March 10, 1970 G. J. STROEBEL 3,499,680
TARPAULIN ROLLER
Filed Sept. 12, 1967 2 Sheets-Sheet 1
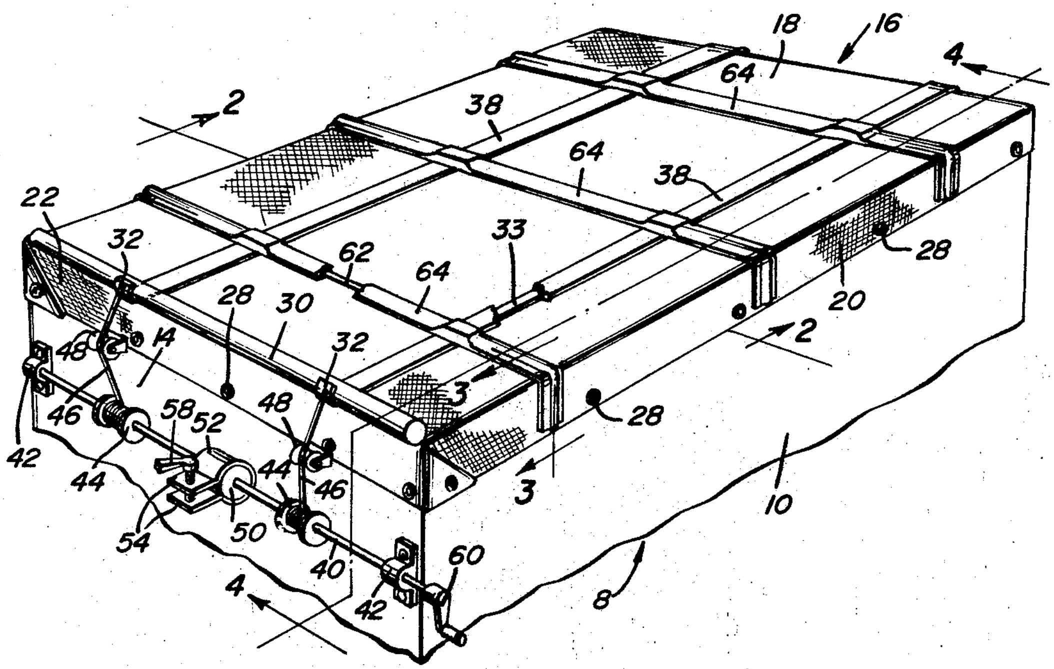
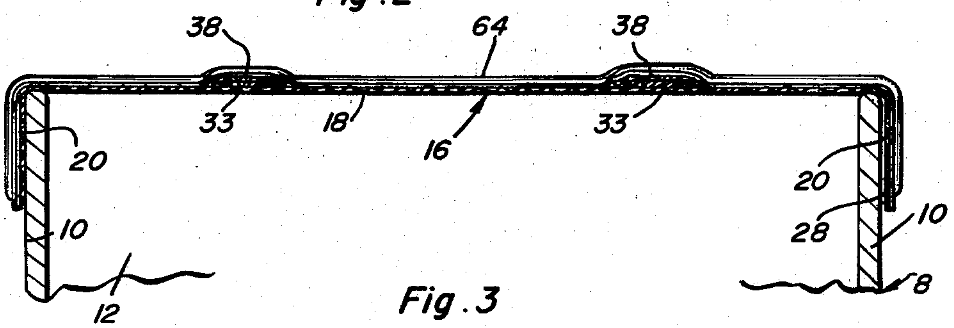
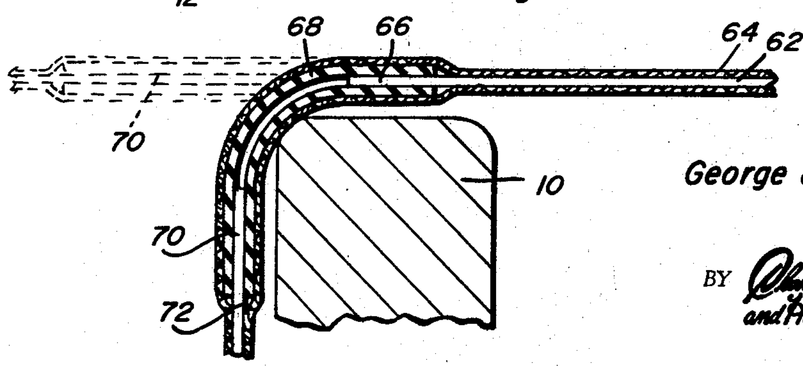
George J. Stroebel
INVENTOR.
BY Clarence A. O'Brien
and Harvey B. Jacobson
Attorneys

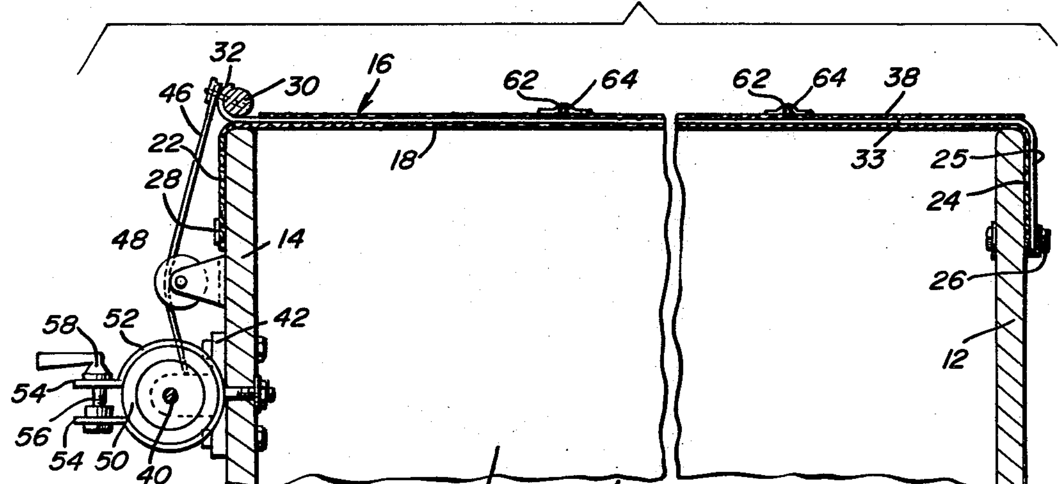
Fig. 4
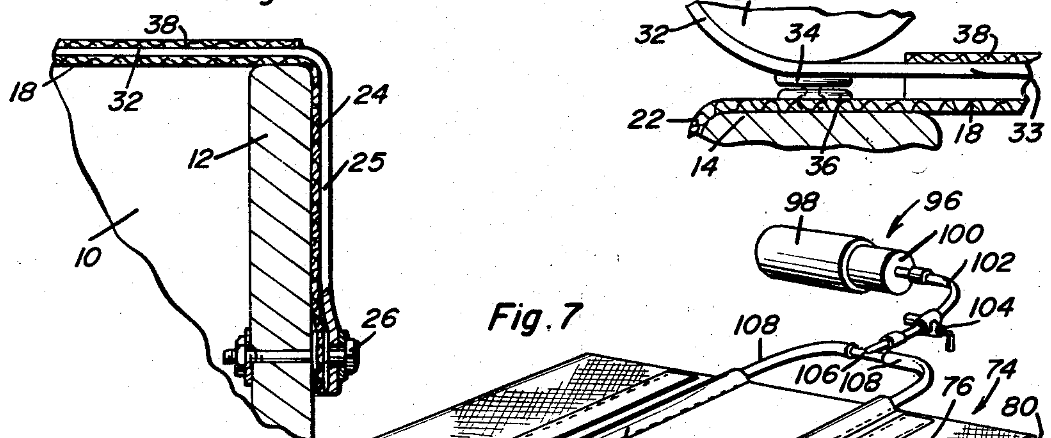
Fig. 5
Fig. 6
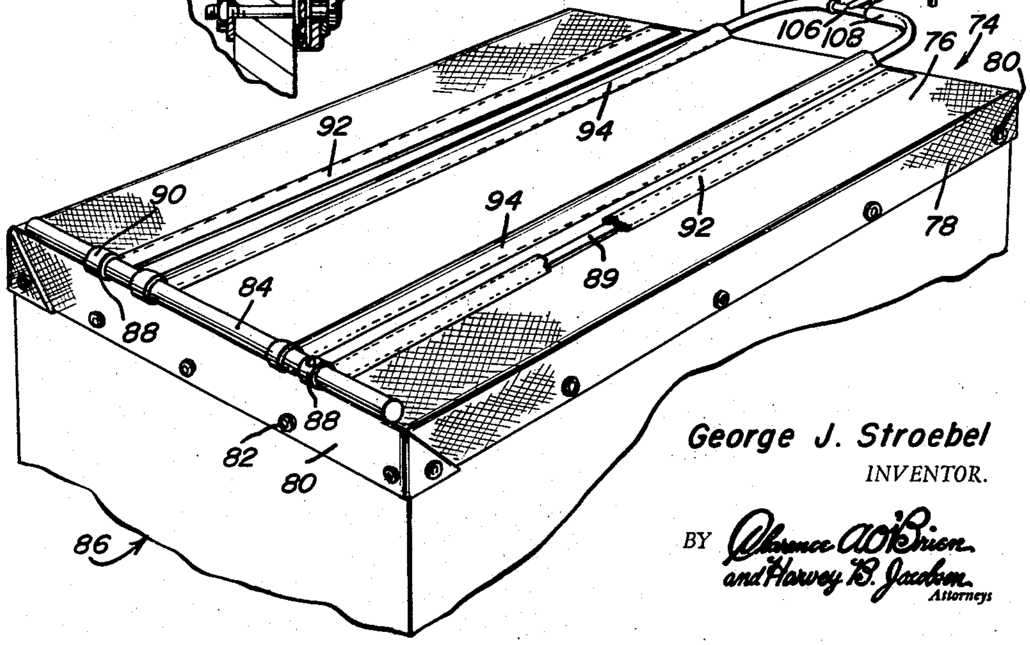
Fig. 7
George J. Stroebel
INVENTOR.
BY Clarence A. O'Brien and Harvey B. Jacobson
Attorneys United States Patent Office 3,499,680

Patented Mar. 10, 1970

1

3,499,680

TARPAULIN ROLLER

George J. Stroebel, R.F.D. Rte. 1, Deering, N. Dak. 58731

Filed Sept. 12, 1967, Ser. No. 667,104
Int. Cl. B60p 7/04
U.S. Cl. 296—98 7 Claims

ABSTRACT OF THE DISCLOSURE

A tarpaulin embodying a rectangular body portion of an area to spread over the open top of a farm type truck. The depending marginal skirt-like flanges drape over and are battened down by grommets and holddown ropes or snap fasteners (as shown). This tarpaulin is unique in that the body portion has lengthwise hems which envelope flat but self-coiling springs. These springs roll up and wind the tarpaulin on a roller to which like ends of the springs are fastened. Means is provided to distend and spread the tarpaulin at will. Transverse stays are also provided to prevent wrinkling and to make sure that the tarpaulin stays put and covers the grain or other produce.

This invention relates to a farm truck cover, a canvas or an equivalent tarpaulin, for example, which is expressly made to spread over the open top of the usual box type body, and which, when the skirt-like marginal flanges are lashed and battened down, serves to protectively cover grain or other contents of the box.

Briefly the invention has to do with a rollable and unrollable tarpaulin which is characterized, generically construed, by a spreadable body portion, more particularly, a portion of a prescribed size in plan that it is capable of amply spanning and covering the open top. This body portion is marginally surrounded that is on all four edges by apron-like flanges which can be securely battened down over the exterior surfaces of the respective upper portion of the two side walls and also the front and back end walls of the truck body. It follows that when the body portion and flanges are fastened down either by ropes passing through grommets or, as shown, optional snap fasteners the tarpaulin stays put. A roller is provided and is so arranged that the tarpaulin is adapted to be coiled and wound, that is, when stored, in an out-of-use position at one end, say the front end, of the truck body. The aforementioned body portion is provided with self-contained means whereby the tarpaulin is capable of appropriately coiling and winding itself around the roller.

More specifically, novelty is predicated upon the aforementioned self-contained means which is characterized by built-in self-coiling springs which are not only coextensive with the length of the body portion but are extended and capable of being bolted or anchored at forward ends on the cooperating end wall of the truck body. Then, too, and to achieve desired end results these springs are of a flat or band type and have the inherent tension necessary that the normal tendency is to coil themselves and, in so doing, wrap the tarpaulin around the roller when the roller is in its stored but ready-to-use position.

One embodiment of the invention is provided with longitudinally spaced transversely extending hems or pockets containing stay rods, said rods having down bent terminal end portions connected with the holddown flanges and said end portions being connected by elastic couplings to the end portions of the stay rods so that when the holddown fasteners are released the respective lengthwise flanges are swung out into coplanar relationship with the body portion.

The invention features an arrangement of cords or flexible elements which are reeled on spools, said spools carried by a rotatably mounted shaft so that when the cords are paid out the coil springs come into play to wind the tarpaulin around the storing roller.

2

In a further form of the invention inflatable and deflatable tubes are arranged atop the body portion and are distended by air from a hand pump which is connected by valved hose means to the intake ends of the extending and contracting tubes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a fragmentary upper portion of a farm truck body and the improved protective cover, more particularly, the tarpaulin and how it is constructed and used.

FIG. 2 is a cross-section taken on the plane of the section line 2—2 looking in the direction of the arrows in FIG. 1.

FIG. 3 is an enlarged detail view taken on the plane of the section line 3—3 of FIG. 1.

FIG. 4 is a view with parts in section and elevation and fragmentarily shown and taken on the plane of the lengthwise section line 4—4 of FIG. 1.

FIG. 5 is an enlarged fragmentary detail view showing the means featured at the forward or right hand end of the truck body related to FIG. 4.

FIG. 6 is an enlarged detail fragmentary view showing the roller at the left, that is the rear end of the truck body and showing the optionally usable snap fasteners.

And FIG. 7 is a view in perspective similar to FIG. 1 but showing a modified form of the cover wherein a hand pump is employed to charge the inflatable and deflatable air tubes in a manner to distend and position the tarpaulin for use.

Attention is first invited to the form of the invention shown in FIGS. 1 to 6, inclusive. The open top rectangular box-type body of the farm truck is designated, generally speaking, by the numeral 8 and comprises a pair of vertical spaced parallel longitudinal side walls 10, a front transverse wall 12 and a rearward transverse vertical end wall 14.

The open top of the box body is protectively closed by the improved cover, more particularly, a canvas or an equivalent tarpaulin 16. This cover comprises a substantially rectangular body portion 18 which is spread properly over the open top and which is provided with surrounding depending marginal flanges, that is, side flanges 20, a rearward flange 22 and a forward flange 24. The flange 24 as shown in FIG. 5 is anchored by a suitable number of holddown bolts 26. As to the other flanges 20 and 22 these can be provided with grommets (not shown) which can be used to batten down the flanges with tying ropes (not shown). An optional securing means comprises a plurality of suitable snap fasteners which are generally denoted at 28. The tarpaulin reeling roller, which may be of suitable construction, is denoted by the numeral 30. This roller is perched above the upper edge of the rear body wall 14 when the cover is spread, that is distributively spread to assume its usable position. The terminal end portions 32 of the flat self-coiling ribbon-like springs 33 are fastened in any suitable manner to the roller 30. One such arrangement is illustrated in FIG. 4. It will also be noted that snap fasteners can be provided as at 34 and 36 (FIG. 6), to assist in maintaining the springs 33 taut, that is, stretched from the rearward wall 14 to the forward wall 12 as shown. Each spring 33 is encased in an appropriate canvas hem or casing 38 which envelopes the spring and is stitched along its edges in the manner shown. By anchoring forward ends 24 as shown in FIG. 5 and rearward ends 32 on the roller as shown in FIG. 4 it will be evident that when the springs are released they automatically coil themselves and at the same time wind or wrap the tarpaulin around the roller, that is, when the side flange 20 and end flanges 22 are unfastened. With reference again to FIG. 5 it will be noted that the downbent end portion 25 of each spring 33 serves to fasten the flange 24 in place.

With particular reference to FIG. 1 it will be noted that the numeral 40 designates a horizontal shaft whose end portions are mounted in bearing brackets 42 fastened to the surface of the rear wall 14. This shaft is provided with spaced reeling spools 44 on which end portions of suitable cords or ropes 46 are reeled. The ropes have their upper ends (FIG. 1) suitably attached to the roller. Median portions are trained over free turning guide pulleys 48 which are bracketed on the wall 14. The numeral 50 designates a brake drum having a split cylindrical part of a friction band 52 surrounding the same. The band is anchored on the wall and has spaced free end portions 54 connected together by bolt and nut means 56 operable by a handle or lever 58 as shown at the left in FIG. 4. The shaft is provided at one end with a hand crank 60. By releasing the brake means 50 and 52 the cords which are attached to the roller are then free to wind around the roller and the windings of the tarpaulin to permit the same to move from a covering position to an uncovered position. In order to free the tarpaulin for the rolling up and uncovering step it is first necessary to disconnect the optionally usable snap fasteners 34 and 36 and loosen the brake means. With the flanges 20 and 22 also unfastened the self-coiling springs 33 come into play and roll up the tarpaulin so that it can assume its stored state (not shown). Assuming that the tarpaulin is in its rolled up or stored state and it is desired to move it to a covering position the hand crank 60 is turned which operates the shaft means 40 and winds the cords back on the spools 44 after which the snap fasteners 34 and 36 and brake means (either one or both) are brought into play to maintain the tarpaulin closed. The snap fasteners 34 and 36 can be dispensed with, if so desired.

It is desirable to distributively spread the tarpaulin so that it will be free of wrinkles and to accomplish this transverse longitudinally spaced stays are provided as illustrated in FIG. 1. Each stay comprises a stiff rod 62 which is enveloped in a canvas hem or sheath 64. As shown in FIG. 3 the rod end 66 is connected to an elastic self-straightening coupling or tube 68 which in turn is connected to an end 70 of a short stay rod 72 in the manner illustrated in FIG. 3. With this construction it will be evident that the stay rod portions 72 are vertical when the flanges are snapped and fastened in place. When the fasteners are released the end rods 72 swing from the vertical full line position shown in FIG. 3 to the horizontal phantom line position shown whereupon the overall tarpaulin can be readily and uniformly rolled up for storage.

In the modified form of the invention shown in FIG. 7 the cover or tarpaulin is basically the same as already described and briefly is denoted generally by the numeral 74 and has a body portion 76 with depending side and end flanges 78 and 80 held down by snap fasteners or equivalent fastening means as denoted generally at 82. In this arrangement the roller is denoted at 84 at the back end of the truck body 86 as shown. Here the coacting end portions 88 of the springs 89 are suitably secured at 90 to spaced end portions of the roller. Again the self-coiling springs (not detailed) can be contained in stitiched hems 92. In this form of the invention instead of using the shaft and cord means illustrated at the left in FIG. 1 it is desirable to employ pneumatic cover extending and retracting means. The means shown comprises a pair of elongated inflatable and deflatable rubber or equivalent tubes 94. These tubes extend alongside the spring containing hems and are extended and retracted by a simple hand pump as shown at 96. This pump comprises a cylinder 98, a plunger 100 connected with a hose 102 provided with a regulating valve 104 which in turn is connected with a T-coupling 106 having hoses 108 connected with intake ends of the inflatable and deflatable air tubes or tubing 94. By pumping air into the tubes it will be evident that the tarpaulin can be unrolled and distended to assume the truck body covering position shown in FIG. 7. By releasing the air the self-coiling springs 89 come into play and roll up the tarpaulin after, of course, the flanges 78 and 80 have been unfastened.

In conclusion, it is reiterated that the aforementioned snap fasteners 34 and 36 (an optional feature) do not have to be employed or relied upon to assist in holding the tarpaulin in the temporarily fastened position (FIG. 6) inasmuch as the ropes 46 (or in the case of air pressure FIG. 7) would suffice to aptly fasten and hold the tarpaulin in an unrolled state. Nor is it a matter of great importance just how the tarpaulin is attached to the roller means. Then, too, it is within the purview of the invention (FIG. 7) that the coilable springs could be jacketed or encased (not shown) in the air tubes 94, whereupon the hems 92 could be dispensed with.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Cover means for an open top box type farm truck comprising, a rollable and unrollable tarpaulin having a spreadable body portion capable of amply spanning and covering said open top, said body portion being marginally surrounded by apron-like flanges which can be tautly drawn down over the exterior surface of the upper portions of the truck's side walls, and front and back end walls and fastened in a manner to prevent the tautly spread tarpaulin from being displaced until desired, a roller around which said body portion is adapted to coil and wind when stored in an out-of-use position at one end of said truck, said body portion having self-contained means whereby it is capable of snugly coiling and winding itself around said roller, said self-contained means comprising built-in self-coiling springs coextensive with and extending longitudinally from one end to the other end of said body portion, manually controllable means operatively cooperable with one end of said truck and the adjacent end portion of said tarpaulin and acting on said self-contained spring means in a manner to distend the same, unfurl the tarpaulin from said roller and cause the tarpaulin to spread itself out and effectually cover said open top, said manually controllable means embodying a rotatably mounted shaft, spools fixed on said shaft, and ropes reeled on their respective spools, trained over fixedly mounted guide pulleys and having forward ends connected to and windable on said roller.

2. The cover means defined in and according to claim 1, and wherein said shaft is mounted for rotation in bearings provided therefor and fixed on the rear end wall of said truck, a brake drum fixed on said shaft, and a clamp mounted on said rear end wall and having yieldable jaws embracing and cooperable with said drum and adapted to grip and release the drum so as to permit rotation of said shaft at will.

3. The cover means defined in and according to claim 1, and, in combination, a plurality of longitudinally spaced stays extending transversely across and atop said tarpaulin from one longitudinal marginal edge to the other longitudinal edge, each stay having a major portion of a length equal to the width of the body portion, also having relatively short auxiliary terminal end portions comparable in length to the width of said flanges and joined to the respectively cooperable ends of said major portion by bendable rubber coupling tubes which function to automatically straighten and bring the flanges in a plane common with the plane of the rollable and unrollable tarpaulin when said flanges are not battened down over the truck walls.

4. Cover means for an open top box type farm truck comprising, a rollable and unrollable tarpaulin having a spreadable body portion capable of amply spanning and covering said open top, said body portion being marginally provided with depending apron-like side and end flanges which can be positioned and drawn down tautly over coverable exterior surfaces of the upper portions of the side walls and at least one end wall of said truck and battened down and releasably fastened in a manner to prevent the then tautly spread tarpaulin from being displaced until intentionally rolled up and stored, a roller of a length equal to the width of said body portion, one end portion of said body portion being secured to said roller, a pair of complemental self-contained self-coiling ribbon-type springs coextensive with and extending longitudinally from one end to the other end of said body portion and having like ends fixed to said roller and coilable around the roller in a manner which results in automatically rolling and winding the tarpaulin around said roller for compact and convenient out-of-use storage, said springs being individualy encased and pocketed in mounting and retaining hems which are stitched lengthwise atop said body portion, and manually controllable means operatively cooperable with one end of said truck and the oriented coordinating end portion of said tarpaulin and acting on said self-contained springs in a manner to distend the same, unfurl the tarpaulin from said roller and cause the tarpaulin to spread itself out and effectually cover said open top.

5. The cover means defined in and according to claim 4 wherein said means embodies integrally attached inflatable and deflatable tubular members capable of being distended in a manner to unwind said springs and to simultaneously flatten and spread said body portion and which when subsequently deflated relieve the tension on said springs in a manner to permit automatic coiling and winding of said springs.

6. The cover means defined in and according to claim 5 and, in combination, a hand held and operated pump, and manually regulable valved hose means communicatively and operably connecting said pump with cooperating air intake ends of the aforementioned tubular members.

7. The cover means defined in and according to claim 4, and, in combination, a plurality of longitudinally spaced stays extending transversely across and atop said tarpaulin from one longitudinal marginal edge to the other longitudinal edge, each stay having a major portion of a length equal to the width of the body portion, also having relatively short auxiliary terminal end portions comparable in length to the width of said flanges and joined to the respectively cooperable ends of said major portion by bendable rubber coupling tubes which function to automatically straighten and bring the flanges in a plane common with the plane of the rollable and unrollable tarpaulin when said flanges are not battened down over the truck walls.

References Cited

UNITED STATES PATENTS

| | | | |
|---|---|---|---|
| 77,499 | 5/1868 | Legg | 160—252 |
| 1,268,892 | 6/1918 | Sunnen | 160—245 |
| 2,584,369 | 2/1952 | Renton | 160—354 |
| 2,807,499 | 9/1957 | Duddleston | 296—100 |
| 2,811,321 | 10/1957 | La Barre | 242—86.52 |
| 3,397,009 | 8/1968 | Landenberger | 296—100 |

BENJAMIN HERSH, Primary Examiner

LESLIE J. PAPERNER, Assistant Examiner

U.S. Cl. X.R.

160—238